(12) United States Patent
Chung (10) Patent No.: US 6,236,466 B1
(45) Date of Patent: May 22, 2001

(54) SYSTEM AND METHOD FOR CONVERTING A GRAY-LEVEL IMAGE INTO A BINARY IMAGE

(75) Inventor: Tzu-Chiang Chung, Taipei (TW)

(73) Assignee: Acer Peripherals, Inc., Taoyuan (TW)

( * ) Notice: Subject to any disclaimer, the term of this patent is extended or adjusted under 35 U.S.C. 154(b) by 0 days.

(21) Appl. No.: 09/182,290

(22) Filed: Oct. 27, 1998

(51) Int. Cl.$^7$ ............................ H04N 1/405; H04N 1/409
(52) U.S. Cl. ............................ 358/1.9; 358/458; 358/462; 382/266
(58) Field of Search ........................... 358/1.9, 447, 455, 358/462, 456, 457, 458, 465, 466, 298, 532, 534, 535, 536; 382/237, 270, 266, 274

(56) References Cited

U.S. PATENT DOCUMENTS

| | | | |
|---|---|---|---|
| 4,554,593 | * 11/1985 | Fox et al. ........................ | 382/252 |
| 5,086,484 | * 2/1992 | Katayama et al. ............... | 382/270 |
| 5,701,366 | * 12/1997 | Ostromoukhov et al. ....... | 382/237 |
| 5,784,488 | * 7/1998 | Kuwata ........................... | 358/455 |
| 5,815,606 | * 9/1998 | Baker et al. .................... | 382/237 |
| 5,970,178 | * 10/1999 | Lin .................................. | 382/251 |

\* cited by examiner

*Primary Examiner*—Scott Rogers
(74) *Attorney, Agent, or Firm*—Winston Hsu (57) ABSTRACT

The present invention relates to an image processing method for converting a gray-level image into a binary image by using an image processing system. The gray-level image comprises a plurality of gray-level pixels arranged in a matrix format. The binary image comprises the same number of binary pixels arranged in the same manner as the gray-level image. The image processing system comprises a memory for storing programs and the gray-level and binary images, and a processor for executing the programs stored in the memory. The image processing method comprises two steps. The first step is to examine the gray-level pixels of the gray-level image so as to locate and define gray-level pixels with boundary characteristics as boundary points according to a predetermined boundary determination method, and to define gray-level pixels next to each of the boundary points as neighboring points according to a predetermined neighboring point determination method. The second step is to convert each of the boundary points and neighboring points of the gray-level image into a corresponding binary pixel according to a first pixel conversion method, and to convert each of the gray-level pixels other than the boundary points and neighboring points in the gray-level image into a corresponding binary pixel according to a second pixel conversion method to generate the binary image.

15 Claims, 11 Drawing Sheets

|   |   |   |   |   |   |   |   |   |   |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 2 | 2 | 2 | 2 | 2 | 2 | 2 | 1 | 0 |
| 0 | 2 | 2 | 1 | 1 | 1 | 2 | 2 | 1 | 0 |
| 0 | 2 | 2 | 1 | 0 | 1 |   |   |   |   |
|   |   |   |   |   |   |   |   |   |   |
|   |   |   |   |   |   |   |   |   |   |
|   |   |   |   |   |   |   |   |   |   |
|   |   |   |   |   |   |   |   |   |   |
|   |   |   |   |   |   |   |   |   |   |

FIG. 2 K

|   |   |   |   |   |   |   |   |   |   |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 2 | 2 | 2 | 2 | 2 | 2 | 2 | 1 | 0 |
| 0 | 2 | 2 | 1 | 1 | 1 | 2 | 2 | 1 | 0 |
| 0 | 2 | 2 | 1 | 0 | 1 | 2 | 2 | 1 | 0 |
| 0 | 2 | 2 | 1 | 0 | 1 | 2 | 2 | 1 | 0 |
| 0 | 2 | 2 | 1 | 0 | 1 | 2 | 2 | 1 | 0 |
| 0 | 2 | 2 | 2 | 2 | 2 | 2 | 2 | 1 | 0 |
| 0 | 1 | 1 | 1 | 1 | 1 | 1 | 1 | 1 | 0 |
| 0 | 0 | 0 | 0 | 0 | 0 | 0 | 0 | 0 | 0 |

FIG. 2 L

| H | H | H | H | H | H | H | H | H | H |
|---|---|---|---|---|---|---|---|---|---|
| H | H | H | H | H | H | H | H | H | H |
| H | L/W | L/B | L/B | L/B | L/B | L/B | L/W | L/W | H |
| H | L/W | L/B | L/B | L/B | L/B | L/B | L/W | L/W | H |
| H | L/W | L/B | L/B | H | L/B | L/B | L/W | L/W | H |
| H | L/W | L/B | L/B | H | L/B | L/B | L/W | L/W | H |
| H | L/W | L/B | L/B | H | L/B | L/B | L/W | L/W | H |
| H | L/W | L/W | L/W | L/W | L/W | L/W | L/W | L/W | H |
| H | L/W | L/W | L/W | L/W | L/W | L/W | L/W | L/W | H |
| H | H | H | H | H | H | H | H | H | H |

SYSTEM AND METHOD FOR CONVERTING A GRAY-LEVEL IMAGE INTO A BINARY IMAGE

BACKGROUND OF THE INVENTION

1. Field of the Invention

The present invention relates to an image processing system, and more particularly, to a system and method for converting a gray-level image into a binary image.

2. Description of the Prior Art

Many image-processing devices need to convert gray-level images into binary images. Line-art/bi-level conversion method and half-tone conversion method are the most commonly used two conversion methods. The line-art/bi-level method uses a gray-level threshold value between 0 and 255 to convert a gray-level pixel. A gray-level pixel with a value greater than the threshold is converted into 1, otherwise it is converted into 0. The converted binary image usually shows a character of strong contrast. Such a conversion method is ideal for text image conversion since the edges of text data usually show strong contrast character, but it is inappropriate for converting graphic images because graphic images usually have a lot of continuous gray-level variations.

The half-tone conversion method includes dither method, error diffusion method, and correlative density assignment of adjacent pixels (CAPIX). The half-tone conversion method can effectively reflect continuous variations of gray levels and can thus be adequately used to convert graphic images. However, in converting text images it will blur the edges of text data and thus should be avoided.

Text and graphic images need to use different conversion methods for converting each of them into a binary image. But since the prior art image conversion method can only be used to convert a complete image each time, a user must make a decision to select a single conversion method which is suitable for converting one type of images even though the image to be converted may contain both types of images.

SUMMARY OF THE INVENTION

It is therefore a primary objective of the present invention to provide an image processing system which can convert both types of images so that the above mentioned problem can be solved.

In a preferred embodiment, the present invention comprises an image processing method for converting a gray-level image into a binary image by using an image processing system, the gray-level image comprising a plurality of gray-level pixels arranged in a matrix format, the binary image comprising the same number of binary pixels arranged in the same manner as the gray-level image, the image processing system comprising a memory for storing programs and the gray-level and binary images, and a processor for executing the programs stored in the memory, the image processing method comprising the following steps:

(1) examining the gray-level pixels of the gray-level image so as to locate and define gray-level pixels with boundary characteristics as boundary points according to a predetermined boundary determination method, and defining gray-level pixels next to each of the boundary points as neighboring points according to a predetermined neighboring point determination method; and (2) converting each of the boundary points and neighboring points of the gray-level image into a corresponding binary pixel according to a first pixel conversion method, and converting each of the gray-level pixels other than the boundary points and neighboring points in the gray-level image into a corresponding binary pixel according to a second pixel conversion method to generate the binary image.

It is an advantage of the present invention that the image processing system assigns an edge-closeness parameter to each of the gray-level pixels in a gray-level image to identify two types of gray-level pixels. The two types of gray-level pixels are then separately converted by using two different image conversion methods. Furthermore, the image processing method can intensify the boundary image by adjusting the maximum value of the edge-closeness parameter thus increasing the flexibility of using the image processing system.

This and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
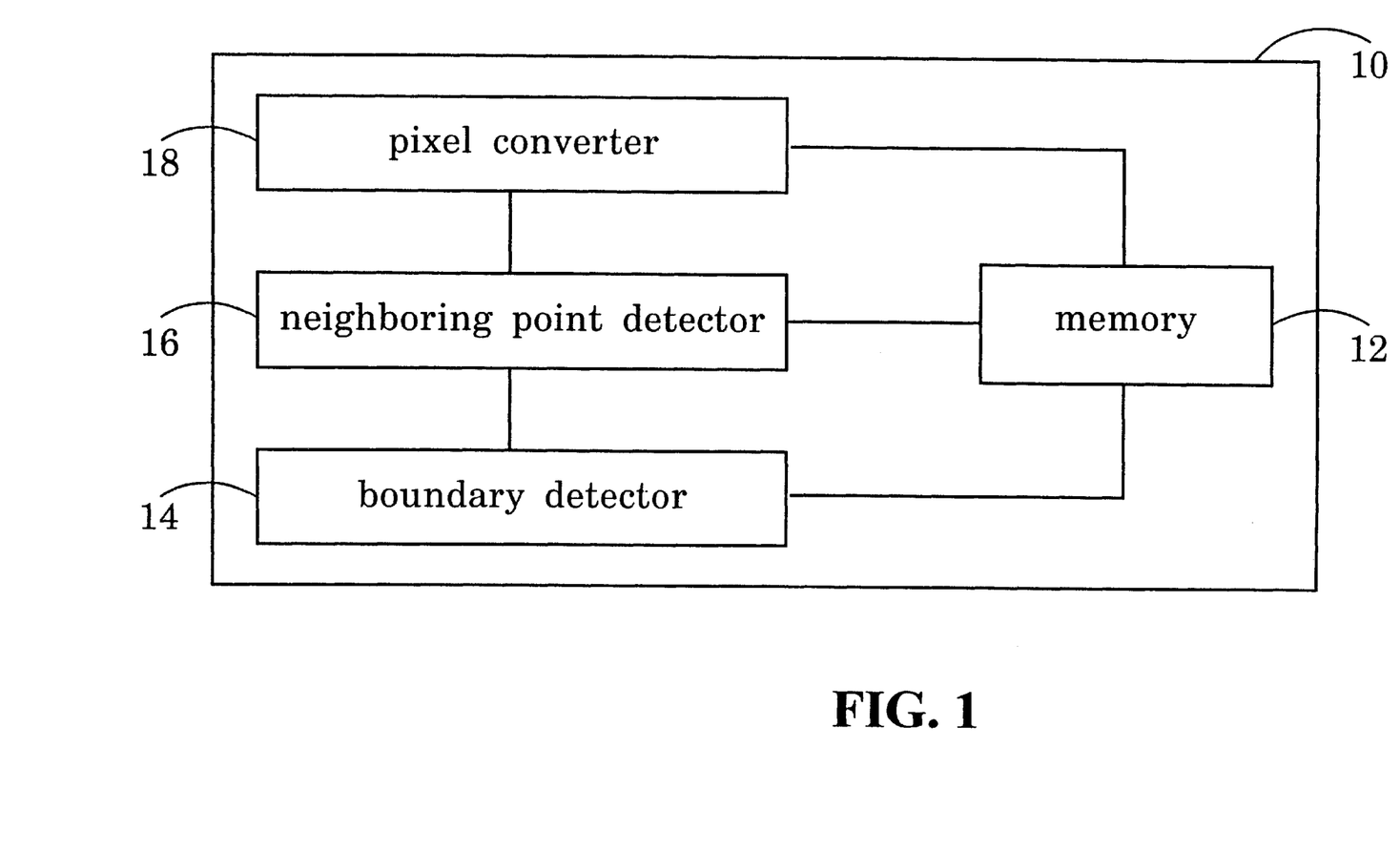
FIG. 1 is a block diagram of an image processing system according to the present invention.

Please refer to FIG. 1. FIG. 1 is a block diagram of an image processing system 10 according to the present invention. The image processing system 10 is used for converting a graylevel image into a binary image. The gray-level image comprises a plurality of gray-level pixels arranged in a matrix format. The binary image comprises the same number of binary pixels arranged in the same manner as the gray-level image. The image processing system 10 comprises a memory 12 for storing the gray-level and binary images, a boundary detector 14 for examining the gray-level image so as to locate gray-level pixels with boundary characteristics and define them as boundary points, a neighboring point detector 16 for defining gray-level pixels next to each of the boundary points as neighboring points according to a predetermined neighboring point determination method, and a pixel converter 18 for converting each of the boundary points and neighboring points of the gray-level image into a corresponding binary pixel according to a line-art pixel conversion method, and converting each of the gray-level pixels other than the boundary points and neighboring points in the gray-level image into a corresponding binary pixel according to a half-tone pixel conversion method to generate the binary image.

The boundary detector 14, neighboring point detector 16 and pixel converter 18 can be executed by using their corresponding hardware, or grouped in a processor (not shown) and executed by using corresponding software. If executed by software, programs have to be stored in the memory 12 and then executed by the processor. Many prior art techniques are capable of using the boundary detector 14 to examine if a gray-level pixel has boundary characteristics and will not be discussed here but the use of the neighboring point detector 16 to determine if a gray level pixel is a neighboring point is explained in FIG. 2.

Figure 2:
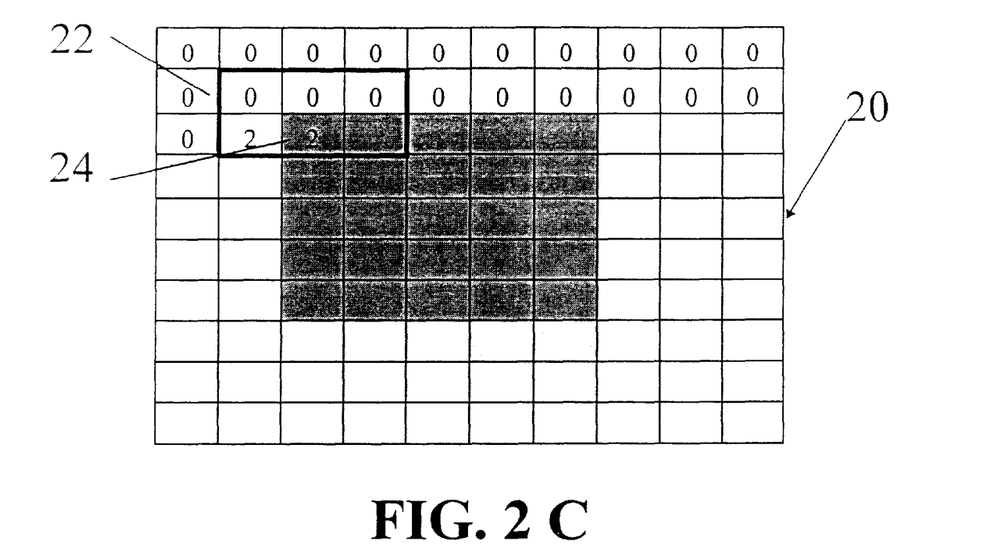
FIGS. 2A to 2M show a pixel matrix of a gray-level image.
FIG. 2N is a binary image converted from the gray-level image in FIGS. 2A to 2M.
Figure 2A:
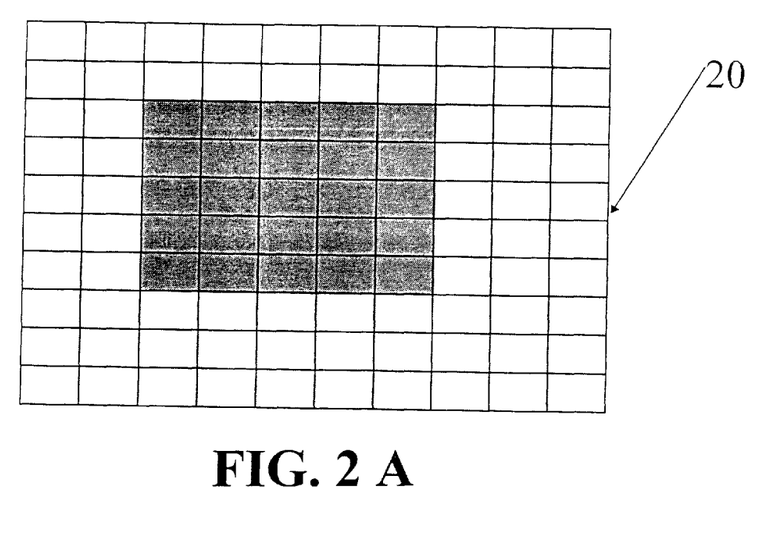
Figure 2B:
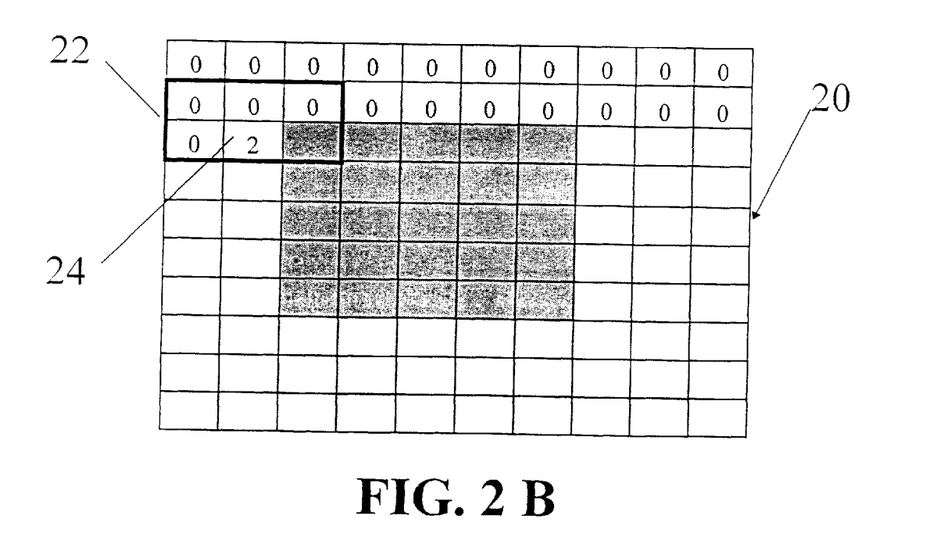
Figure 2E:
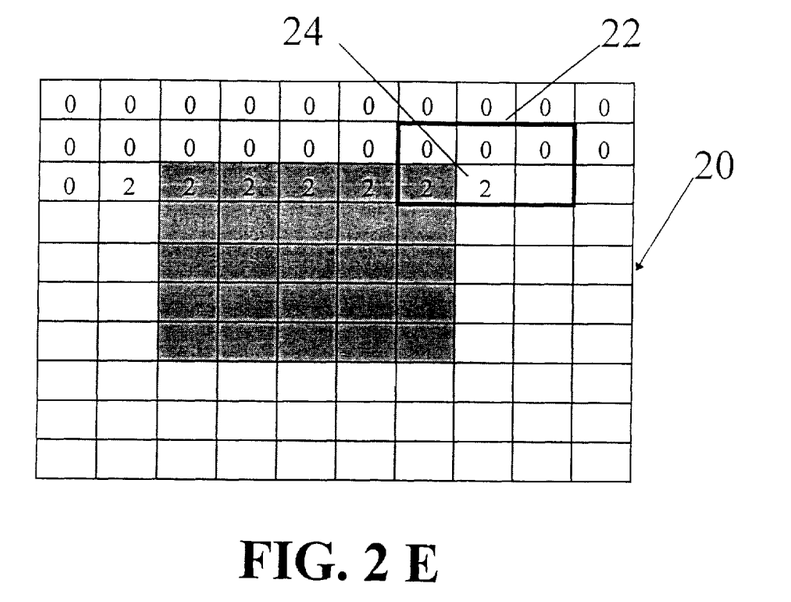

Please refer to FIGS. 2A to 2M. FIGS. 2A to 2M show a pixel matrix 20 of a gray-level image in various phases of examining neighboring points. FIG. 2A comprises a gray-level image with a dark-colored central portion and light-colored sides. The gray-level image is formed by a 10×10 pixel matrix 20. When the neighboring point detector 16 examines whether a gray-level pixel is a neighboring point, it will assign each gray-level pixel a corresponding edge-closeness parameter. When a pixel is determined to be a boundary point, its edge-closeness parameter will be assigned a predetermined maximum value such as 2 in this embodiment. The rest of the gray-level pixels each will be assigned a smaller number such as 0 depending on how far the pixel is away from the boundary points. If the edge-closeness parameter of a gray-level pixel is between the maximum and 0, the gray-level pixel is a neighboring point.

Figure 2F:
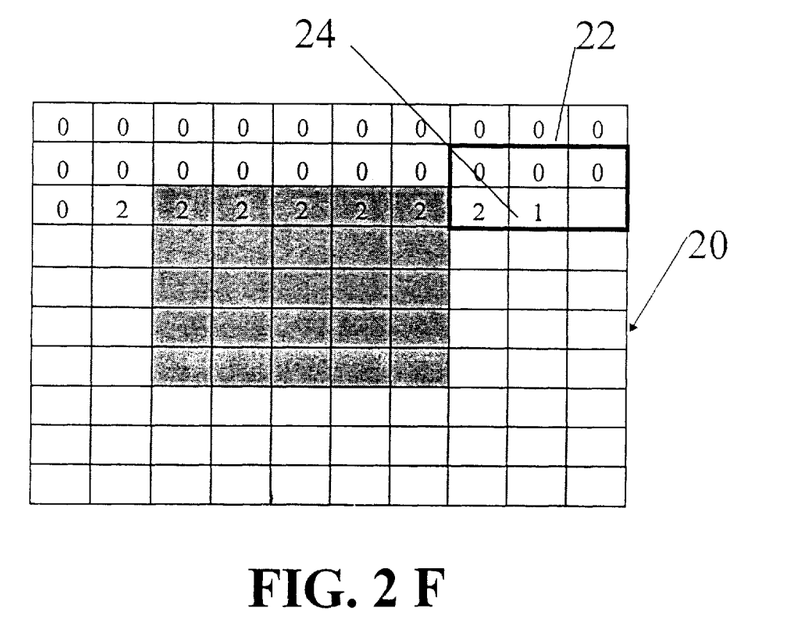
Figure 3:
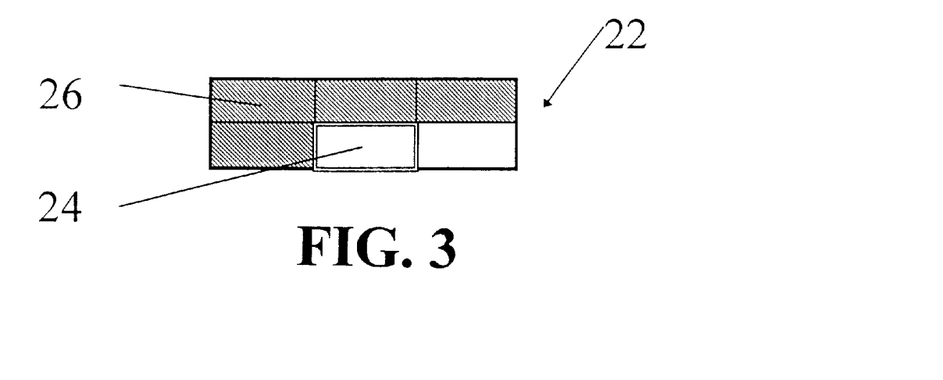
FIG. 3 shows a conversion matrix.

When assigning edge-closeness parameters, the neighboring point detector 16 will define a conversion matrix with a fixed dimension first, and then process each of the gray-level pixels in a left to right and top to bottom sequence. The 3×2 matrix enclosed by the bold-faced square in FIGS. 2B to K is a conversion matrix 22 which comprises the gray-level pixels currently being processed. Please refer to FIG. 3. FIG. 3 shows the conversion matrix 22. The conversion matrix 22 comprises a target pixel 24 enclosed by a double-layered square and four reference pixels 26 filled with slash lines. The target pixel 24 is the gray-level pixel to be assigned an edge-closeness parameter. The four reference pixels 26 are used as decision-making references for assigning the edge-closeness parameter to the target pixel 24. If the target pixel 24 within the conversion matrix 22 is detected as a boundary point by the boundary detector 14, the target pixel 24 will be assigned a number 2 as its edge-closeness parameter. If the target pixel 24 within the conversion matrix 22 is not a boundary point, and the edge-closeness parameters of the reference pixels 26 are either undefined or are 0, the target pixel 24 will be assigned a value of 0. If the target pixel 24 within the conversion matrix 22 is not a boundary point, and the reference pixels 26 contain at least one pixel with an assigned value greater than 0, the target pixel 24 will be assigned a number equal to 1 less than the greatest assigned value of the reference pixels 26.

When assigning edge-closeness parameters to gray-level pixels in the first two rows of the gray-level matrix 20, all twenty pixels are assigned a value 0 because the boundary detector 14 has not detected any boundary points and each reference pixel 26 is either undefined or assigned a value of 0. In the conversion matrix 22 in FIGS. 2B to 2E, all target pixels 24 are assigned a value 2 because each is a boundary point. In FIG. 2F, the target pixel 24 is not a boundary point, and three of the four reference pixels 26 have edge-closeness parameters assigned as 0 with the other reference pixel 26 assigned a value of 2, thus the target pixel 24 is assigned a value equal to 1 less than the greatest value 2 which is 1. In FIG. 2G, the target pixel 24 is not a boundary point, and the four reference pixels 26 are all assigned values of 2, thus the target pixel 24 is assigned a value of 1. In FIGS. 2H and 2I, because the target pixels 24 are both boundary points, they are assigned values of 2. In FIG. 2J, the target pixel 24 is not a boundary point, and the four reference pixels 26 are assigned values of 1, thus the target pixel 24 is assigned a value of 0. In FIG. 2K, the target pixel 24 is not a boundary point, and the greatest value of the four reference pixels 26 is 2, thus the target pixel 24 is assigned a value of 1. FIG. 2L shows the edge-closeness parameters of all gray-level pixels. The gray-level pixels that are assigned values of 2 are boundary points, and those whose values are assigned between 0 and 2 are neighboring points.

After all edge-closeness parameters are assigned, all points are outputted to the pixel converter 18 where boundary points and neighboring points undergo line-art pixel conversion processing and other gray-level pixels undergo half-tone pixel conversion processing. In line-art pixel conversion, a gray-level boundary value is first defined to be used in determining if gray-level pixels will be converted to white or black. The gray-level boundary value should be defined as between the gray-level values of gray-level pixels inside and outside a boundary so that the gray-level pixels at two sides of the boundary can be converted into different colors thus intensifying the boundary image. In FIG. 2M, pixels with the letter H are converted by using the half-tone pixel conversion, pixels with the letter L/W are converted by using the line-art pixel conversion and are converted into white gray-level pixels, and pixels with the letter L/B are converted by using the line-art pixel conversion and are converted into black gray-level pixels. All gray-level pixels will be converted into binary pixels by the pixel converter 18. FIG. 2N shows a binary image converted from the gray-level image in FIGS. 2A to 2M. The binary image in FIG. 2N shows that at two sides of the boundary, the darker side becomes even darker, and the lighter side becomes even lighter thus the boundary appears very clear. At portions not along the boundary line such as the center and sides of the matrix 20, the pixels are converted by using half-tone pixel conversion, thus the color appears to change smoothly like the gray-level pixels before conversion.

Figure 4:
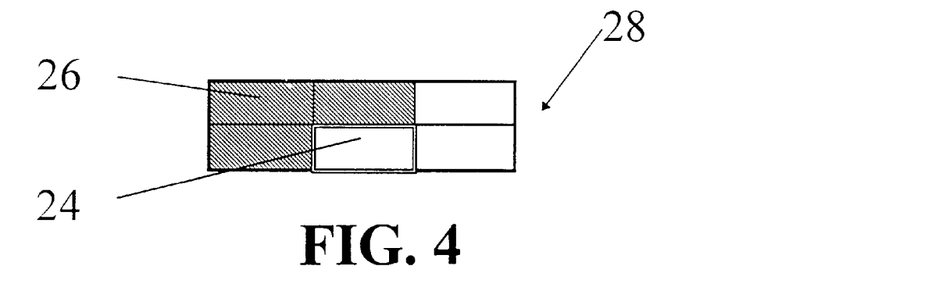
FIG. 4 is another embodiment of the conversion matrix in FIG. 3.
Figure 5:
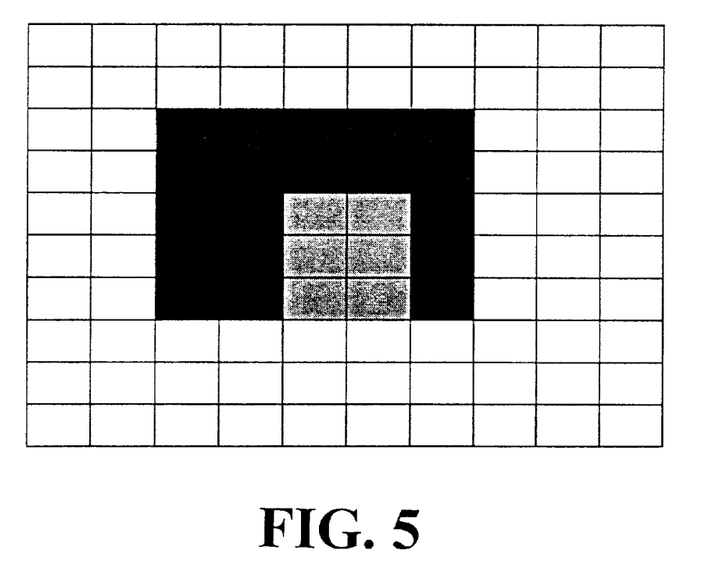
FIG. 5 shows a binary image generated by using the conversion matrix in FIG. 4.

The aforementioned conversion matrix 22 has a dimension of 3×2 with the middle pixel in the second row defined as the target pixel 24. However, the dimension of the conversion matrix 22 and the position of the target pixel 24 are flexible and can be defined according to the capacity of the memory 12 and the processing speed of the image processing system 10. Moreover, the number and the position of the reference pixels 26 of the conversion matrix 22 are also variable. Please refer to FIGS. 4 and 5. FIG. 4 shows another conversion matrix 28. FIG. 5 shows a binary image generated by using the conversion matrix 28 in FIG. 4. The conversion matrixes 28 and 22 differ in that the conversion matrix 28 only has three reference pixels 26 whereas the conversion matrix 26 has four. FIG. 5 shows that when the gray-level matrix 20 is converted by using fewer reference pixels, fewer gray-level pixels will be defined as neighboring points, thus fewer gray-level pixels will be converted by using the line-art pixel conversion method while more will be converted by using the half-tone pixel conversion method, and thus the edges of the generated binary image will become less distinct. The number and position of the reference pixels can be defined according to different requirements in the sharpness of the edges.

Figure 6:
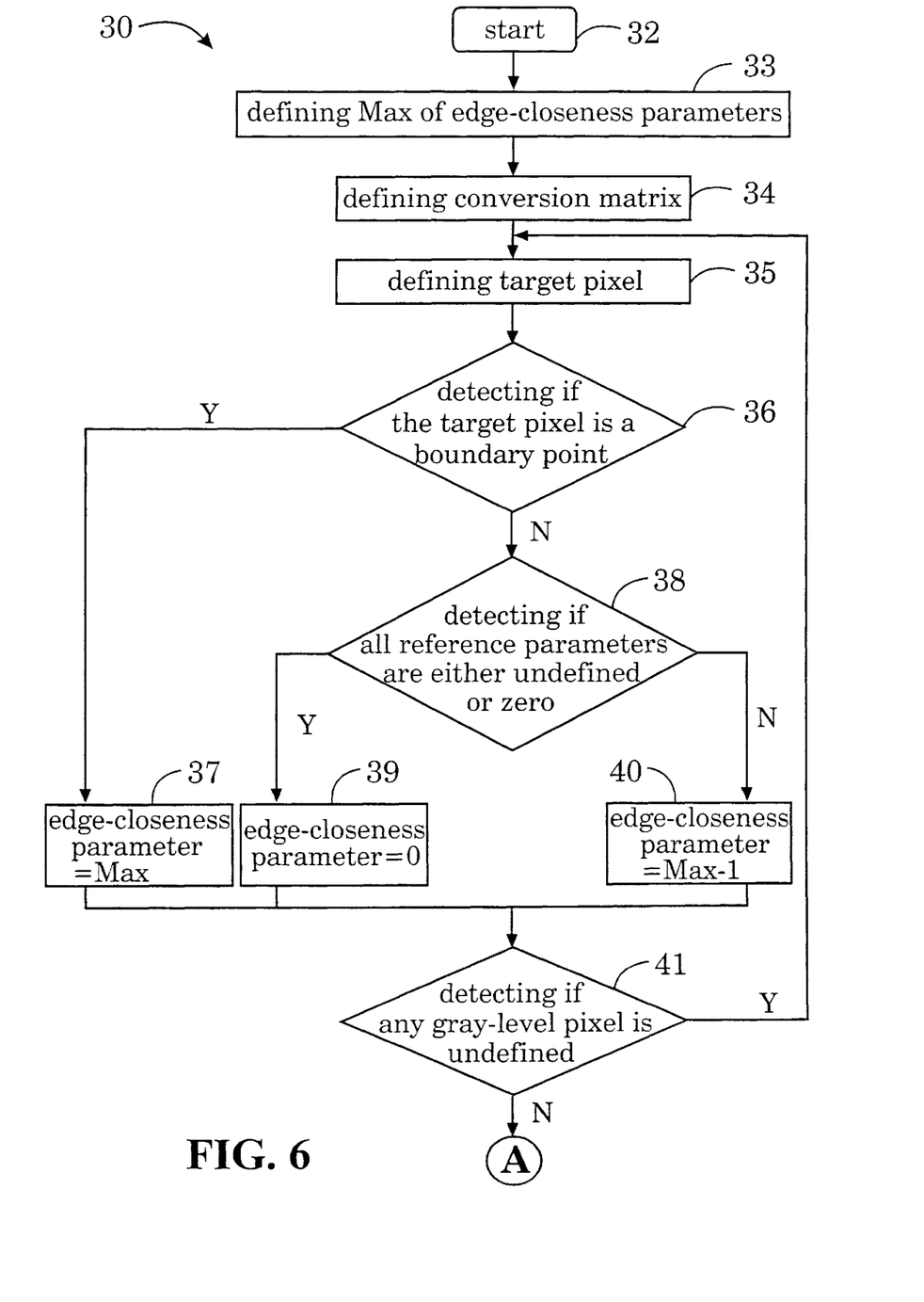
FIGS. 6 and 7 are flowcharts of an image processing method according to the present invention.
Figure 7:
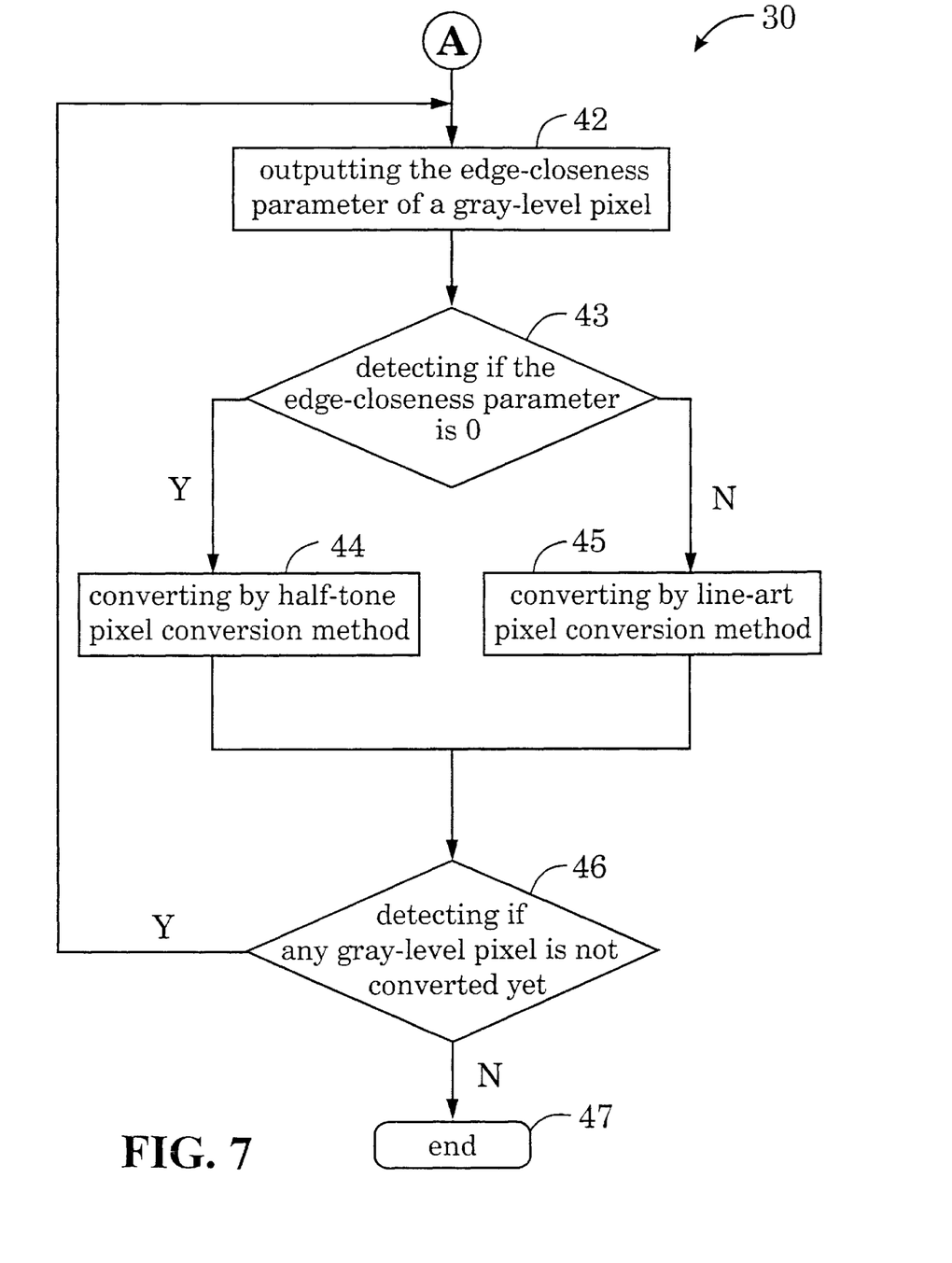

Please refer to FIGS. 6 and 7. FIGS. 6 and 7 are flowcharts of an image processing method 30 according to the present invention. The image processing method 30 comprises the following steps:

step 32: start;
step 33: defining the maximum value of the edge-closeness parameters;

step 34: defining the number of rows and columns of the conversion matrix 22, and defining the corresponding positions of the target pixel 24 and reference pixels 26 in the conversion matrix 22;

step 35: selecting a gray-level pixel as the target pixel 24 for assigning the edge-closeness parameter;

step 36: detecting if the target pixel 24 is a boundary point; if not, go to step 38;

step 37: assigning the maximum value of the edge-closeness parameters to the target pixel 24, go to step 41;

step 38: detecting if the edge-closeness parameters of all reference parameters are either undefined or assigned a value of 0; if not, go to step 40;

step 39: assigning 0 as the edge-closeness parameter to the target pixel 24; go to step 41;

step 40: assigning an edge-closeness parameter to the target pixel 24 which is equal to 1 less than the greatest edge-closeness parameters of the reference pixels 26;

step 41: detecting if each of the gray-level pixels is assigned an edge-closeness parameter; if not, go to step 35;

step 42: outputting the edge-closeness parameter of each of the gray-level pixels to the pixel converter 18 for converting into a binary pixel;

step 43: detecting if the edge-closeness parameter of a gray-level pixel is zero; if not, go to step 45;

step 44: converting the gray-level pixel by using the half-tone pixel conversion method; go to step 46;

step 45: converting the gray-level pixel by using the line-art pixel conversion method;

step 46: detecting if all gray-level pixels are converted into binary pixels; if not, go to step 42;

step 47: end.

In step 33, the maximum value of the edge-closeness parameters will directly affect the number of neighboring points. A greater maximum value is associated with a greater number of neighboring points therefore causing a greater number of gray-level pixels using the line-art conversion method that intensifies the boundary image. The maximum value of the edge-closeness parameter can be assigned according to the content of the original image. The image processing method 30 can either assign an edge-closeness parameter to a target pixel 24 after the status of the pixel 24 is determined, or find out all gray-level pixels with boundary characteristics first and then assign an edge-closeness parameter to each of the target pixels 24.

In contrast to the prior art image processing system, the image processing system 10 of the present invention assigns an edge-closeness parameter to each of the gray-level pixels in a gray-level image to identify two types of gray-level pixels. The two types of gray-level pixels are then separately converted by two different image conversion methods in order to upgrade the generated image. Furthermore, the image processing method 30 can intensify the boundary image by adjusting the maximum value of the edge-closeness parameter thus increasing the flexibility of using the image processing system 10.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An image processing method for converting a gray-level image into a binary image by using an image processing system, the gray-level image comprising a plurality of gray-level pixels arranged in a matrix format, the binary image comprising the same number of binary pixels arranged in the same manner as the gray-level image, the image processing system comprising a memory for storing programs and the gray-level and binary images, and a processor for executing the programs stored in the memory, the image processing method comprising the following steps:

(1) examining the gray-level pixels of the gray-level image so as to locate and define gray-level pixels with boundary characteristics as boundary points according to a predetermined boundary determination method, and defining gray-level pixels next to each of the boundary points as neighboring points according to a predetermined neighboring point determination method; and (2) converting each of the boundary points and neighboring points of the gray-level image into a corresponding binary pixel according to a first pixel conversion method, and converting each of the gray-level pixels other than the boundary points and neighboring points in the gray-level image into a corresponding binary pixel according to a second pixel conversion method to generate the binary image.

2. The image processing method of claim 1 wherein the first pixel conversion method is a line-art pixel conversion method.

3. The image processing method of claim 2 wherein the line-art pixel conversion method compares a gray-level pixel with a predetermined reference number and determines the gray-level pixel should be converted into 0 or 1 as a binary pixel according to the result of the comparison.

4. The image processing method of claim 1 wherein the second pixel conversion method is a half-tone pixel conversion method.

5. The image processing method of claim 1 wherein the neighboring point determination method comprises the following steps:

(1) assigning a predetermined natural number to each of the boundary points of the gray-level image;

(2) defining a neighboring area of a gray-level pixel which comprises the positions of the gray-level pixels adjacent to the gray-level pixel;

(3) assigning a value to each of the undefined gray-level pixels which are not yet assigned in the gray-level image according to a predetermined sequence: assigning 0 to an undefined gray-level pixel if the gray-level pixels in the neighboring area of the undefined pixel are either undefined or assigned as 0, or else assigning a number to an undefined gray-level pixel which is equal to 1 less than the greatest assigned value of the gray-level pixels in the neighboring area if the gray-level pixels in the neighboring area contain at least one pixel with an assigned value greater than 0; and (4) defining the gray-level pixels with assigned values other than the predetermined natural number or 0 as the neighboring points.

6. An image processing system for converting a gray-level image into a binary image, the gray-level image comprising a plurality of gray-level pixels arranged in a matrix format, the binary image comprising the same number of binary pixels arranged in the same manner as the gray-level image, the image processing system comprising:

a memory for storing the gray-level and binary images;

a boundary detector for examining the gray-level image so as to locate and define gray-level pixels with boundary characteristics as boundary points;

a neighboring point detector for defining gray-level pixels next to each of the boundary points as neighboring points according to a predetermined neighboring point determination method; and a pixel converter for converting each of the boundary points and neighboring points of the gray-level image into a corresponding binary pixel according to a first pixel conversion method, and converting each of the gray-level pixels other than the boundary points and neighboring points in the gray-level image into a corresponding binary pixel according to a second pixel conversion method to generate the binary image.

7. The image processing system of claim 6 wherein the first pixel conversion method is a line-art pixel conversion method.

8. The image processing system of claim 7 wherein the line-art pixel conversion method compares a gray-level pixel with a predetermined reference number and determines the gray-level pixel should be converted into 0 or 1 as a binary pixel according to the result of the comparison.

9. The image processing system of claim 6 wherein the second pixel conversion method is a half-tone pixel conversion method.

10. The image processing system of claim 6 wherein the neighboring point determination method comprises the following steps:

(1) assigning a predetermined natural number to each of the boundary points of the gray-level image;

(2) defining a neighboring area of a gray-level pixel, which comprises the positions of the gray-level pixels adjacent to the gray-level pixel;

(3) assigning a value to each of the undefined gray-level pixels which are not yet assigned in the gray-level image according to a predetermined sequence: assigning 0 to an undefined gray-level pixel if the gray-level pixels in the neighboring area of the undefined pixel are either undefined or assigned as 0, or else assigning a number to an undefined gray-level pixel which is equal to 1 less than the greatest assigned value of the gray-level pixels in the neighboring area if the gray-level pixels in the neighboring area contain at least one pixel with an assigned value greater than 0; and (4) defining the gray-level pixels with assigned values other than the predetermined natural number or 0 as the neighboring points.

11. An image processing method for converting a gray-level image into a binary image by using an image processing system, the gray-level image comprising a plurality of gray-level pixels arranged in a matrix format, the binary image comprising the same number of binary pixels arranged in the same manner as the gray-level image, the image processing system comprising a memory for storing programs and the gray-level and binary images, and a processor for executing the programs stored in the memory, the image processing method comprising the following steps:

(1) detecting each of the gray-level pixels of the gray-level image according to a predetermined boundary determination method and a predetermined neighboring point determination method, using the boundary determination method to define the gray-level pixels with boundary characteristics as boundary points, and using the neighboring point determination method to define the gray-level pixels adjacent to each of the boundary points as neighboring points; and (2) converting each of the boundary points and neighboring points of the gray-level image into a corresponding binary pixel according to a first pixel conversion method, and converting each of the gray-level pixels other than the boundary points and neighboring points in the gray-level image into a corresponding binary pixel according to a second pixel conversion method to generate the binary image.

12. The image processing method of claim 11 wherein the first pixel conversion method is a line-art pixel conversion method.

13. The image processing method of claim 12 wherein the line-art pixel conversion method compares a gray-level pixel with a predetermined reference number and determines the gray-level pixel should be converted into 0 or 1 as a binary pixel according to the result of the comparison.

14. The image processing method of claim 11 wherein the second pixel conversion method is a half-tone pixel conversion method.

15. The image processing method of claim 11 wherein step (1) further comprises following steps:

(a) detecting the gray-level pixel by using the boundary determination method and assigning it a predetermined natural number if it contains boundary characteristics according to the boundary determination method, if not, go to (b);

(b) assigning 0 to the gray-level pixel if pixels adjacent to it are either undefined or assigned as 0; assigning a number to an undefined gray-level pixel which is equal to 1 less than the greatest assigned value of the adjacent pixels if the adjacent pixels contain at least one pixel with an assigned value greater than 0; and (c) defining the gray-level pixels with assigned values other than the predetermined natural number or 0 as neighboring points.

\* \* \* \* \*